United States Patent
Reynes (10) Patent No.: US 9,162,541 B2
(45) Date of Patent: Oct. 20, 2015

(54) METHOD FOR DETECTING LEAKAGE OF A VEHICLE TIRE

(71) Applicants: CONTINENTAL AUTOMOTIVE FRANCE, Toulouse (FR); CONTINENTAL AUTOMOTIVE GmbH, Hannover (DE)

(72) Inventor: Jean-Luc Reynes, Toulouse (FR)

(73) Assignees: CONTINENTAL AUTOMOTIVE FRANCE, Toulouse (FR); CONTINENTAL AUTOMOTIVE GMBH, Hannover (DE)

( * ) Notice: Subject to any disclaimer, the term of this patent is extended or adjusted under 35 U.S.C. 154(b) by 275 days.

(21) Appl. No.: 13/860,884

(22) Filed: Apr. 11, 2013

(65) Prior Publication Data

US 2013/0274988 A1 Oct. 17, 2013

(30) Foreign Application Priority Data

Apr. 12, 2012 (FR) ...................................... 12 53355

(51) Int. Cl.
*B60C 23/04* (2006.01)

(52) U.S. Cl.
CPC ......... *B60C 23/0408* (2013.01); *B60C 23/0476* (2013.01); *B60C 23/0477* (2013.01)

(58) Field of Classification Search
CPC B60C 23/04; B60C 23/0408; B60C 23/0474; B60C 23/0476; B60C 23/0477
USPC ....................... 701/29.4, 31.1, 31.2
See application file for complete search history.

(56) References Cited

U.S. PATENT DOCUMENTS

| | | | |
|---|---|---|---|
| 5,895,846 A | 4/1999 | Chamussy et al. | |
| 6,658,928 B1 * | 12/2003 | Pollack et al. | 73/146 |
| 7,075,417 B2 * | 7/2006 | Harada et al. | 340/442 |
| 7,216,532 B2 * | 5/2007 | Rimkus et al. | 73/146 |
| 7,432,801 B2 | 10/2008 | Verrier et al. | |
| 2005/0280522 A1 * | 12/2005 | Verrier et al. | 340/442 |
| 2007/0191996 A1 * | 8/2007 | Bondu | 701/1 |
| 2007/0251310 A1 * | 11/2007 | Pompier | 73/146 |
| 2008/0042817 A1 * | 2/2008 | Fogelstrom | 340/442 |
| 2010/0217471 A1 * | 8/2010 | Stenman et al. | 701/29 |

FOREIGN PATENT DOCUMENTS

| | | |
|---|---|---|
| DE | 195 45 618 A1 | 6/1997 |
| EP | 0 792 760 B1 | 9/1997 |

(Continued)

OTHER PUBLICATIONS

French Search Report, dated Dec. 12, 2012, from corresponding French application.

*Primary Examiner* — Thomas G Black
*Assistant Examiner* — Ce Li
(74) *Attorney, Agent, or Firm* — Young & Thompson (57) ABSTRACT

In order to avoid the risk of false alarms by supplementing the pressure and temperature measurements with a particular monitoring of their change over time, there is proposed a method which includes: converting referenced pressure measurements ($\Delta P$) into values of a magnitude calibrated in temperature called converted pressure ($\Delta P_T$); monitoring for at least two sampling periods (n1, n2) multiples of a measurement period, the change in a difference called significant ($\Delta Q$) at each measurement moment between the values of the converted pressure ($\Delta P_T$) and a referenced temperature ($\Delta T$). The slope (p(n)) of these variations is monitored and signifies either an absence of leakage or an air leakage at a fast or slow rate.

13 Claims, 8 Drawing Sheets

FOREIGN PATENT DOCUMENTS

| | | |
|---|---|---|
| EP | 0 786 361 A1 | 1/2003 |
| EP | 1 270 275 B1 | 1/2003 |
| FR | 2 871 736 A1 | 12/2005 |
| FR | 2 900 099 A1 | 10/2007 |
| WO | 01/43998 A1 | 6/2001 |
| WO | 2008/119523 A1 | 10/2008 |

* cited by examiner

METHOD FOR DETECTING LEAKAGE OF A VEHICLE TIRE

FIELD OF THE INVENTION

The invention relates to a method for detecting air leakage in a tire, whether it be a fast leakage (in the case of burst tire for example) or a slow leakage (through diffusion of the air), this method including several types of measurements and of determinations in order to prevent false alarms.

BACKGROUND OF THE INVENTION

The field of the invention is the monitoring of the state of the tires as a function of the parameters of temperature and of pressure of these tires, in particular in the motor vehicle field. The tire pressure detection systems, known by the name TPMS (the initials of Tire Pressure Monitoring System) or SSPP (the initials for "Système de Surveillance de la Pression des Pneus" (in French)), comprises temperature and pressure sensors located in each tire, for example on the rim, and a central processor unit for processing the data supplied by these sensors by radio transmission.

In the event of leakage, these sensors supply the driver with information on the state of the tires with the aid of a display based on the processing of the data. Alarm means are triggered when this state corresponds to parameter values that go beyond a ceiling or fall below predefined thresholds.

In order to allow the detection of air leakages in a tire, whether they be slow or fast, various techniques for monitoring the pressure of this tire have been developed. It is known for example from patent EP 0 786 361 to monitor the inflation pressure (and/or a characteristic parameter), while safeguarding the pressure-drop measurements in several ways: by comparing the pressure data of several wheels with one another, by measuring the pressure regularly several times over different time periods, and by using a statistical method called "regression lines" calculated on the basis of these measurements. This solution requires long measurement periods and does not use the temperature compensation of the pressure measurements.

It is also known, for example from patent FR 2 871 736, that the detection of air leakages can advantageously be carried out by compensating for the value of the pressure with that of the temperature, and by comparing it with a threshold. This method makes it possible to quickly obtain results but it does not involve noise filtering and the risk of false alarms is thus not eliminated.

Patent FR 2 900 099 furthermore proposes to monitor the temperature-compensated pressure while neutralizing the alarms if the temperature variation per unit of time is less than a threshold value, provided that the pressure remains sufficient. But when the temperature does not vary very much, this approach can generate false alarms.

In general, the methods of the prior art culminate in the appearance of false alarms, despite the improvements made in the speed of detection.

SUMMARY OF THE INVENTION

The object of the invention is to avoid the risk of false alarms by supplementing the pressure and temperature measurements with a particular monitoring of their change over time. In order to do this, the fact that the pressure and temperature of a gas are a priori proportional has been taken into account, and studying the change in these two parameters as a function of time makes it possible to identify events affecting the pressure characteristics of the tire, notably: standard state (no leakage), fast leakage, slow leakage, braking, acceleration.

More precisely, the subject of the present invention is a method for detecting air leakage from a tire, wherein two parameters of temperature and of pressure of the air inside the tire are measured at successive moments separated by a measurement period, the measurements of the two parameters are referenced. This method consists in converting the referenced pressure measurements into values of a magnitude calibrated in temperature called converted pressure, in monitoring for at least two sampling periods, multiples of the measurement period, the change in a difference called significant at each measurement moment between the values of the converted pressure and the referenced temperature, these variations in the parameters being established over one and the same processing period greater than or equal to the highest sampling period, in determining slopes of variation in the significant difference for each sampling over the processing period and, when the slope of variation in the difference remains negative for at least one sampling over the processing period, in estimating that an air leakage is detected with a fast or slow level of flow rate associated with threshold values for the sampling period(s) in question.

According to preferred embodiments:

- the number of samplings is equal to three with a first period sampling equal to the measurement period and the other two sampling periods equal to multiples of the measurement period;
- the pressure measurements and temperature measurements of the air of each of the tires of a vehicle are supplied by sensors according to the measurement period, transmitted to a central processor unit at the moments set by the measurement period, the measurements corresponding to the moments set by each sampling period, called sampling measurements, are selected on the basis of the measured values, stored in a memory when the vehicle starts and is running, and processed in the central unit in order to supply the slopes of variation in the significant difference;
- for each tire, the parameters are referenced on the basis of the values of temperature and of pressure minus reference measurements taken on startup, and the conversion of the pressure into temperature is determined by the application of a coefficient equal to the ratio between a reference temperature measurement and a reference pressure measurement to the values taken by the converted pressure;
- the slope of variation in the significant difference is established, for each sampling, by an average variation in this significant difference over a number of consecutive sampling periods defining the processing period;
- the number of periods taken into account is sufficient to confirm the reproducibility of the difference variation slope values with the aid of at least two determined threshold values, an amplitude threshold value and a period confirmation threshold value;
- for each sampling in standard running conditions, during a period at least equal to the period confirmation threshold, the slope is substantially zero in the event of no air loss, greatly negative in the event of fast leakage for at least the shortest period sampling, and constant for at least the longest period sampling, after a drop at least equal to the amplitude threshold.

One of the advantages of the invention is that it dispenses with noise and other decorrelations of measurements between the temperature and the pressure by using at least one sampling with a sufficiently long period.

According to advantageous features:

the measurements of the parameters are smoothed over time;

the number of samplings is equal to two, the first sampling having a period equal to the measurement period and the second a period chosen between 2 to 6 times the measurement period;

the number of samplings is equal to three, the first sampling having a period equal to the measurement period, the second a period chosen between 2 to 4 times the measurement period, and the third a period chosen between 5 and 12 times the measurement period;

the number of samplings is equal to three, the first sampling having a period equal to the measurement period, the second chosen between 2 to 6 times the measurement period and the third a period between 7 and 12 times the measurement period;

the measurement period is chosen between 15 seconds and one minute.

BRIEF DESCRIPTION OF THE DRAWINGS

Other objects, features and advantages of the present invention will appear on reading the following nonlimiting description with reference to the appended figures which represent, respectively.

DETAILED DESCRIPTION OF THE INVENTION

Figure 1:
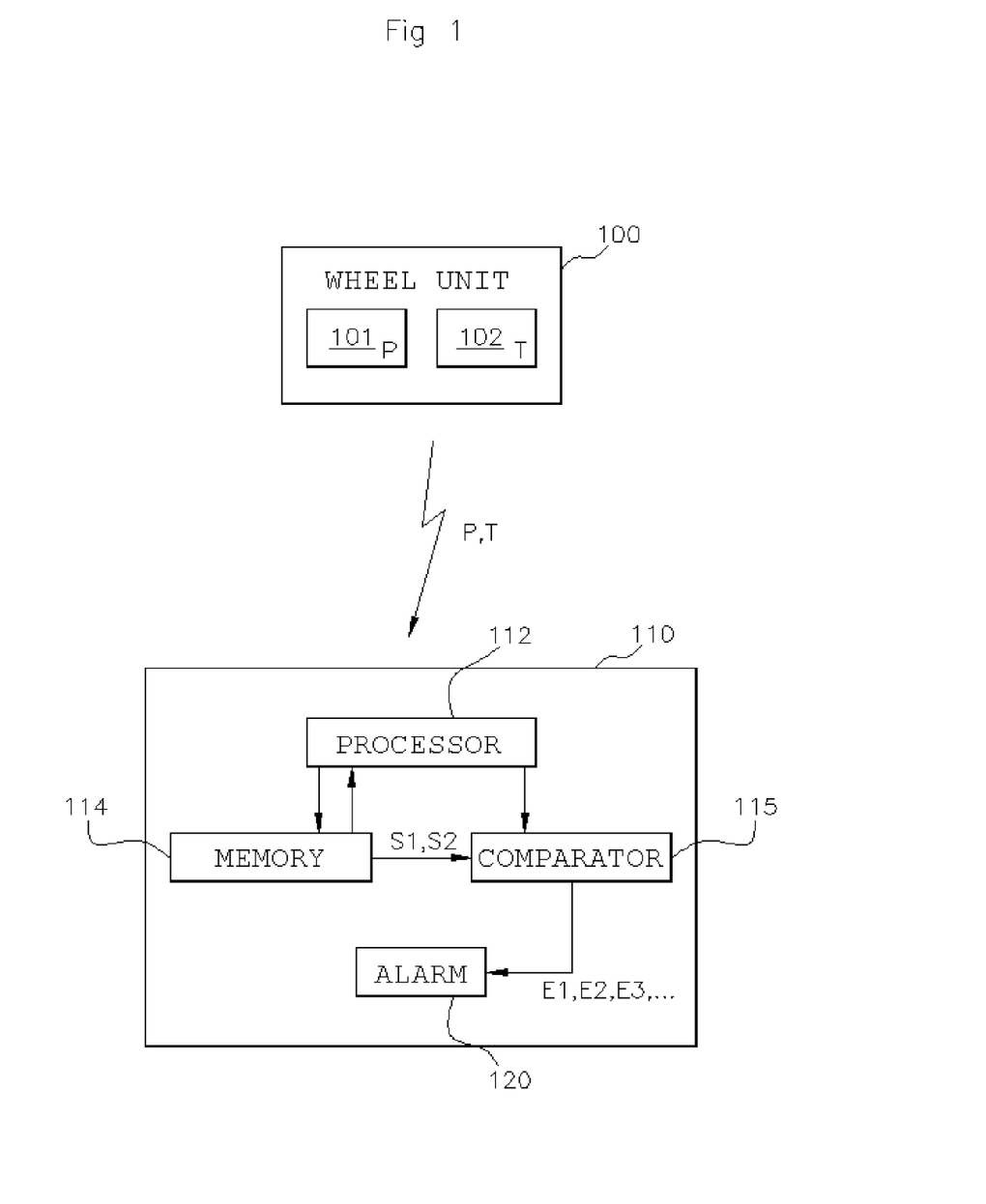
FIG. 1, a functional diagram between each wheel unit and the central processor unit of the measurements supplied.

The functional diagram of FIG. 1 illustrates the transmission of the data of the air pressure parameters P and temperature parameters T of each tire of a vehicle. The data are measured by a pressure sensor 101 and a temperature sensor 102 of each wheel unit 100 arranged in the tire, on the wheel rim. The data are sent by radio frequency to a central processor unit 110 at successive moments, set according to the measurement period of the sensors. In the example, the measurement period is equal to 1 minute.

The measurements of the parameters P and T taken at moments set by each sampling period, called sampling measurements, are selected from the data transmitted on startup of the vehicle and then during its journey. The sampling measurements of the parameters P and T are then processed in the unit 110 by a processor 112, in connection with a memory 114 and a value comparator 115. This comparator compares the values of variations in significant differences, determined on the basis of the sampling measurements and of the data supplied by the processor 112, as explained below, with threshold values S1 and threshold values S2 also stored in the memory 114. On leaving the comparator 115, an estimation confirmation signal E1, E2, E3, etc. may or may not be transmitted to an alarm supplier 120 which is fitted, for example, to the vehicle dashboard.

The data of the pressure parameters P and temperature parameters T as measured successively by the sensors and the sampling measurements for each sampling are processed in the unit 110 in the following manner, with reference to the main steps of the diagram of FIG. 2. The measurements of the parameters P and T taken in step 1 are first referenced (step 2) by difference with reference values, respectively $P_{ref}$ and $T_{ref}$, supplied by the sensors in step 1 on startup of the vehicle. The differences $P-P_{ref}$ and $T-T_{ref}$ thus referenced are marked $\Delta P$ and $\Delta T$ and respectively called referenced pressure and referenced temperature.

The referenced pressure data $\Delta P$ are advantageously converted into data of a magnitude depending only on the temperature $\Delta P_T$ (step 4). To do this, a compensation coefficient KT is defined by the relation $T_{ref}/P_{ref}$ (step 3) based on the measurements $T_{ref}$ and $P_{ref}$ (step 1). The converted pressure $\Delta P_T$ is then obtained by application of the coefficient KT: $\Delta P_T = KT \times \Delta P$. The referenced data $\Delta T$ and $\Delta P_T$ are uniform magnitudes of temperature dimensioned according to the same unit (degrees Celsius).

Then (step 5) a significant difference $\Delta Q$ between the successive referenced values of converted pressure 66 $P_T$ and referenced temperature $\Delta T$ ($\Delta Q = \Delta P_T - \Delta T$) is generated and stored. The significant difference also has a temperature dimension. Moreover, the variations in this difference $\Delta Q$ for two consecutive sampling measurements, with reference to a sampling of period n, are determined, averaged and stored. Its change is then characterized by a slope of variation p(n) which again has a temperature dimension.

For each setting of sampling period n (step 6), three samplings in the example of period n1 equal to 1 min, n2 equal to 5 min and n3 equal to 10 min are used. A slope p(n) is thus generated for each period n. The monitoring of three estimation magnitudes: significant differences $\Delta Q$, referenced temperatures $\Delta T$ and slope p(n) for three settings in the example (n=1, 5 and 10 min) will then make it possible to supply estimations E1, E2, E3, etc. (step 7) on states of leakage of the tire—respectively: no leakage, fast air leakage, slow air leakage—, as a function of the data and of threshold values of amplitude S1 and of period S2 that are stored. As will appear in the situations described below, up to three pairs of threshold values of amplitude and of confirmation in period S1a, S1b, S1c and S2a, S2b, S2c are designed to detect, respectively, fast leakages, during an estimation E2, and slow leakages by an estimation E3. All the detection thresholds are applied in parallel during the processing period.

Figure 3A:
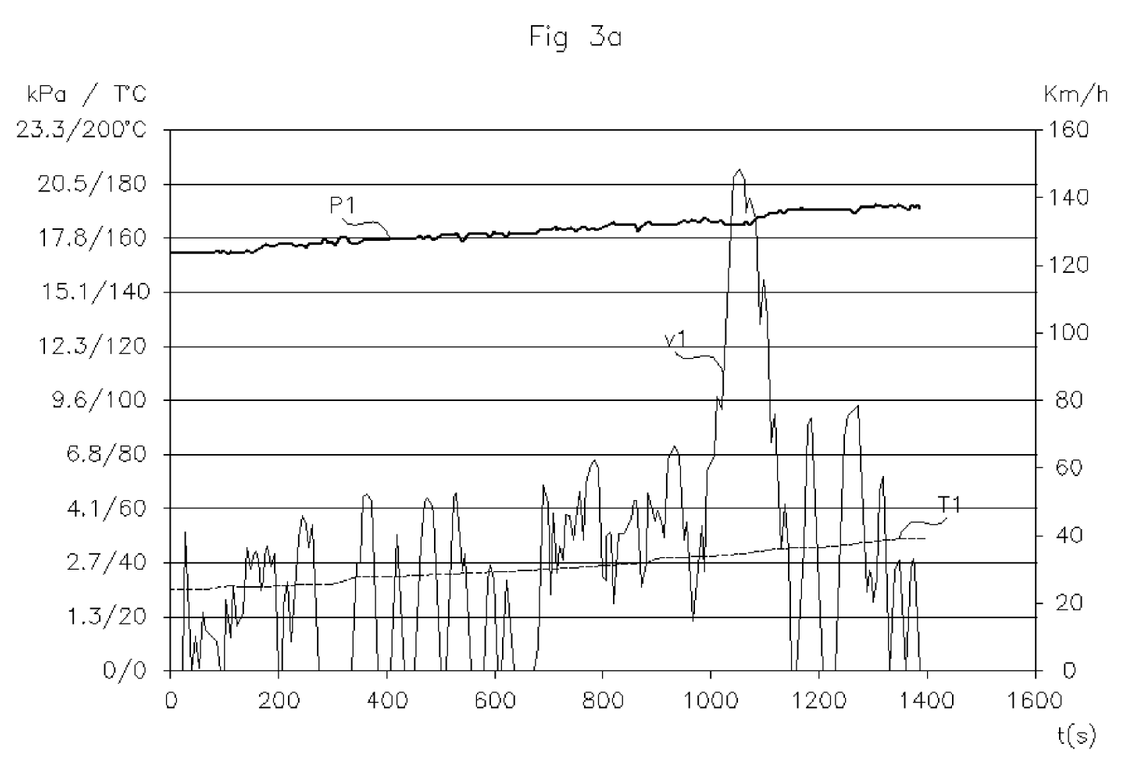
FIG. 3a, a diagram of the change over time of the pressure and temperature parameters, in association with the speed of a tire which illustrates a case of no leakage.

With reference to FIG. 3a, the diagram illustrates the direct change in the measurements over time "t" on a first path, of the parameters of pressure P1 and of temperature T1 of a tire, in relation with the speed v1 (in km/h) of the vehicle. In the situation illustrated, the pressure P1 increases with the slow increase in the temperature T1, according to the law of proportion of ideal gases with a constant volume "V" (P1V=nRT1, where n=the number of moles of the gas, R being the constant of ideal gases).

The instantaneous speed v1 of the vehicle shows many oscillations reflecting more or less long phases of acceleration and deceleration, for example around 1100 seconds where the slope of the speed v1 increases and decreases rapidly with a peak at more than 140 km/h.

Figure 2:
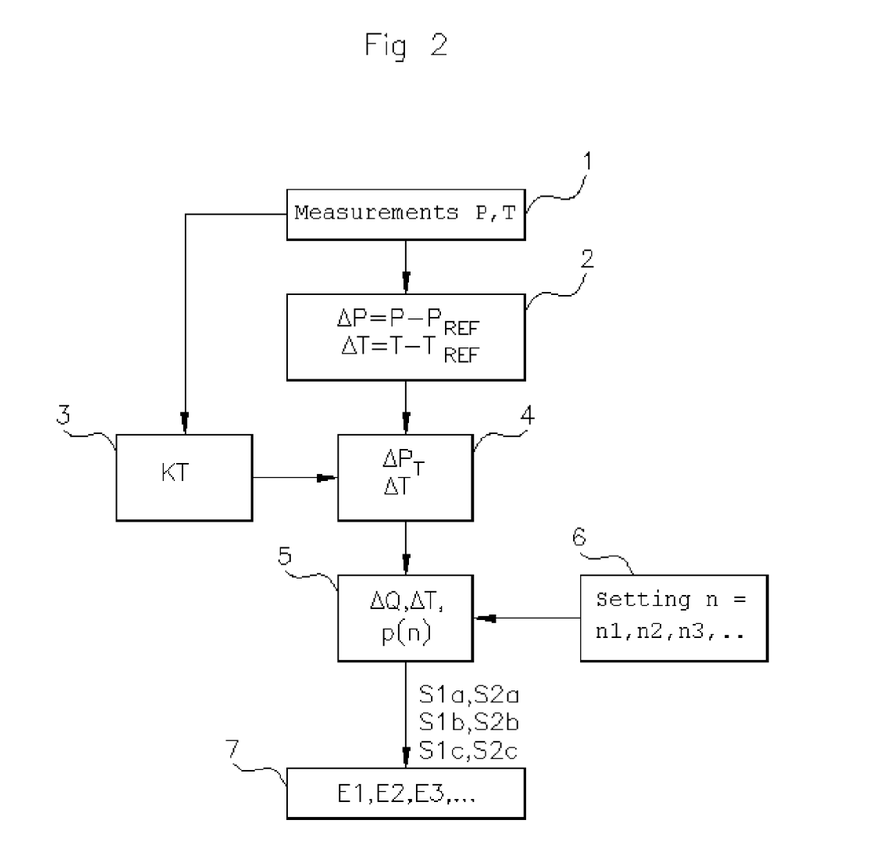
FIG. 2, a diagram of the main steps in monitoring the pressure of each tire and of detecting leakages.
Figure 3B:
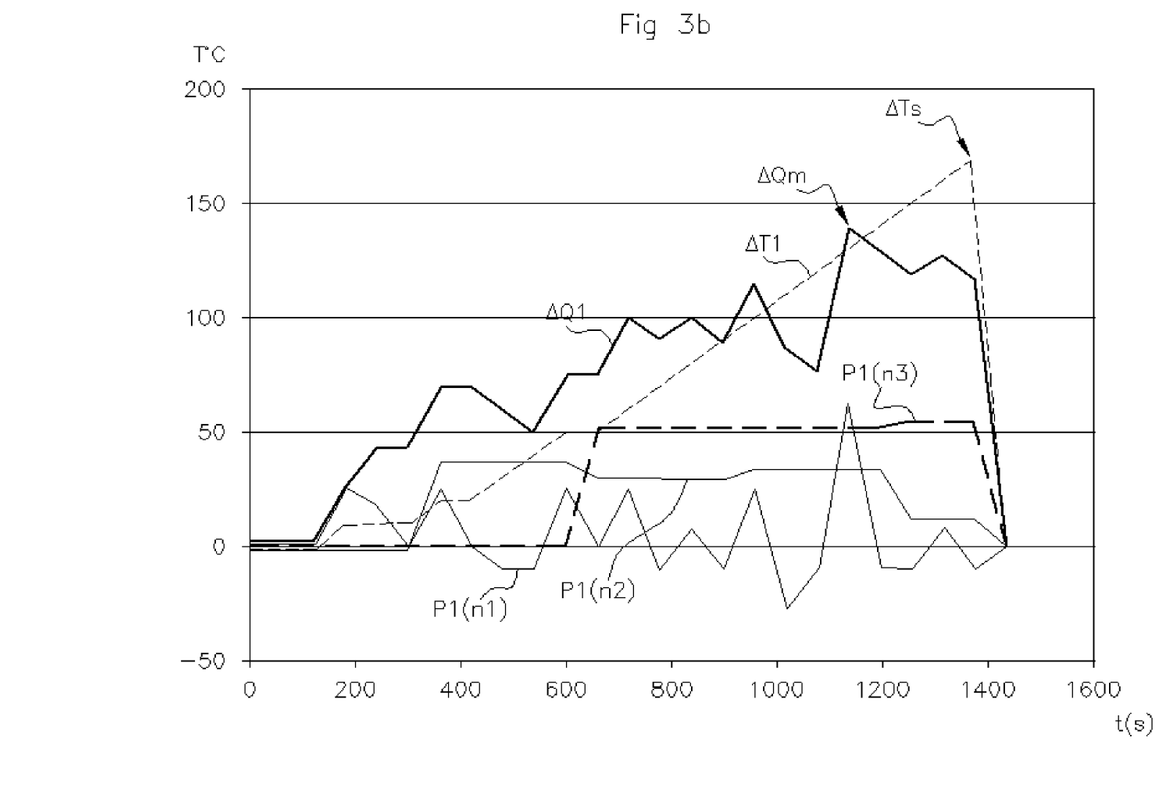
FIG. 3b, in the same case as that of the preceding figure, a detailed diagram of change over time in the variations in the temperature and in the significant difference, and in the variations in the slopes p(n) of the significant differences for three samplings.

The utilization of the data of this diagram is illustrated by that of FIG. 3b which shows the variations, with a scale of the temperatures T that is ten times as large, of the estimation magnitudes: ΔT1, ΔQ1 and of the slope p(n) of variations in the significant difference ΔQ1 for the three sampling period settings (n1=1 min, n2=5 min and n3=10 min) of the example. These magnitudes are determined on the basis of the data of the parameters T1 and P1 as explained above with reference to steps 6 and 7 of FIG. 2. The diagram illustrates the particular variations in these magnitudes in connection with specific running conditions, in the following manner:

the even rise in the referenced temperature ΔT1 up to the peak ΔTs falls sharply from the stopping of the vehicle (or the resetting of the data processing) at a moment situated approximately 1400 s after running begins;

the significant difference ΔQ1 also goes through a maximum ΔQm around 1100 seconds, corresponding to the acceleration/deceleration phase of greatest amplitude (identified with reference to FIG. 3a);

the curve of change in the slope p1(n1=1 min) is "affected by interference" which results in oscillations, in particular at the time of the acceleration around 1100 seconds, while the other slopes p1(n2) and p1(n3) (where n2=5 min and n3=10 min) of the other two longer measurement period settings are substantially more smoothed over a large central portion.

Therefore, it appears that the significant difference ΔQ1 increases slowly with the referenced temperature ΔT1 and that the slopes of variation in the significant difference p1(n1), p1(n2) and p1(n3) remains substantially constant for the three sampling period settings decorrelated from the variations in the other estimation magnitudes, ΔT1 and ΔQ1. These substantially constant changes in the slopes p1(n) of the variations in the significant difference for three different periods make it possible to estimate—estimation El—that no air leakage has appeared during the processing period for the given journey, which is the case.

Figure 4A:
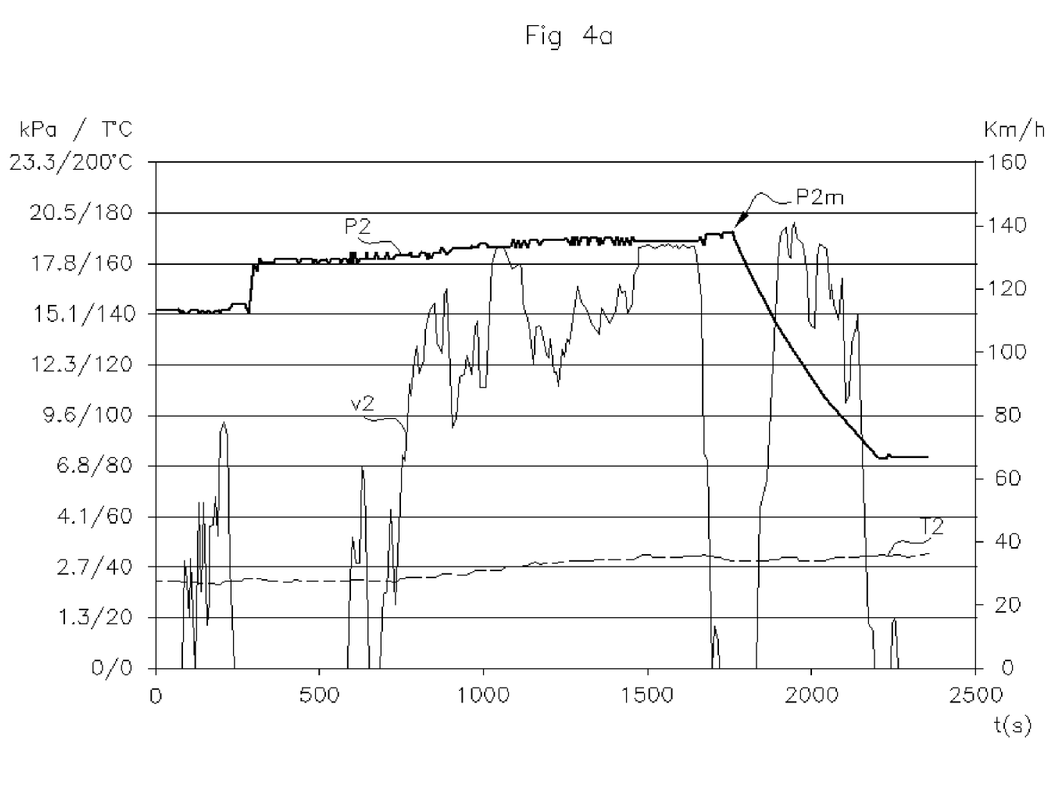
FIG. 4a, a diagram of the change over time in the parameters of a tire, in association with its speed, and characterizing a situation of fast leakage.

With reference to FIG. 4a, the diagram illustrates the change in direct measurements of the parameters P2 and T2 of a tire, also in connection with the speed v2 (in km/h) of the vehicle, over a time period "t" of approximately 2500 seconds covering a second journey.

In this diagram, it appears that the pressure P2 rises slowly with the temperature T2 up to a point P2m, and then decreases from a moment approximately equal to 1700 seconds, with a regular decrease of slope approximately equal to −18 kPa/min. The temperature T2 continues to rise slowly, whereas the speed of the vehicle v2 marks two stops, around 400 seconds and around 1700 seconds.

Figure 4B:
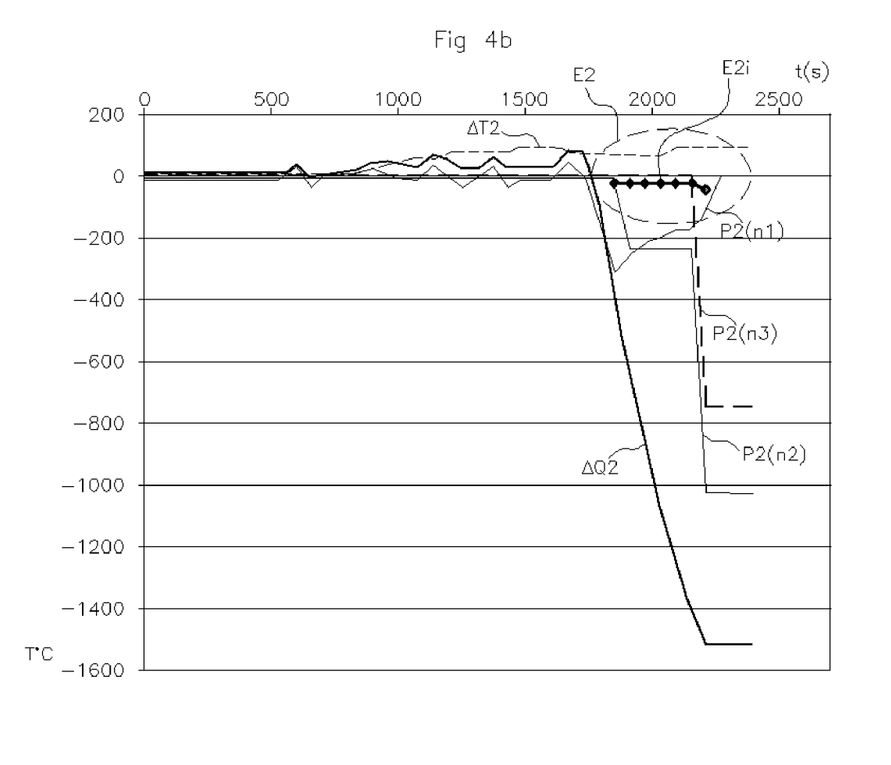
FIG. 4b, in the same situation of fast leakage (FIG. 4a above), the detailed diagram of change in the magnitudes expressed for FIG. 3b, with reiteration of an alarm confirmation.

The detailed diagram of FIG. 4b shows, on a scale of temperature T that is enlarged 10 times (as above with reference to FIG. 3b), the three estimation magnitudes: ΔT2, ΔQ2 and slopes p2(n) of the variations in the significant difference ΔQ2, for the same sampling period settings "n" as before:
n1=1 min, n2=5 min and n3=10 min.

Whereas the curve of referenced temperature ΔT2 rises slowly, as it can be predicted, the curve of significant difference ΔQ2 shows a "sharp" decrease to the negative values, from the moment 1700 seconds, corresponding to the beginning of the decrease in pressure at the point P2m (FIG. 4a).

The slopes p2(n) show falls in value that are staged over time because of the increasing sampling periods: the slope p2(n1) with the shortest period (n1=1 min) falls first at approximately 1700 seconds, the slope p2(n2) with a medium period (n2=5 min) falls twice at approximately 1800 seconds and then at approximately 2200 seconds, and the slope p2(n3) with the longest period (n3=10 min) falls at approximately 2200 seconds.

Also with reference to FIGS. 1 and 2, the falls in slope p(n) are compared with the aid of the comparator 115 at thresholds of amplitude S1a and of period confirmation S2a stored in the memory 114 in order to be adopted in an estimate of fast air leakage E2. S1a is equal to −100° C. and S2a equal to +120 seconds in the example. In these conditions, during the time period of 500 seconds—devoted to the estimation E2—seven fast leakage signals E2i are triggered by the alarm 120. The first six are triggered by the drop in the slope p2(n1) and the last by the drop in the slope p2(n2), while the drop in the slope p2(n1) is not confirmed because it is not maintained over at least the period of S2a (in this instance set to 120 seconds). In general, the threshold S2a is equal to a number of measurement periods that is small but sufficient to allow a fast air leakage to be detected. This FIG. 4B therefore illustrates clearly a case of fast air leakage with a negative slope p(n).

Figure 5A:
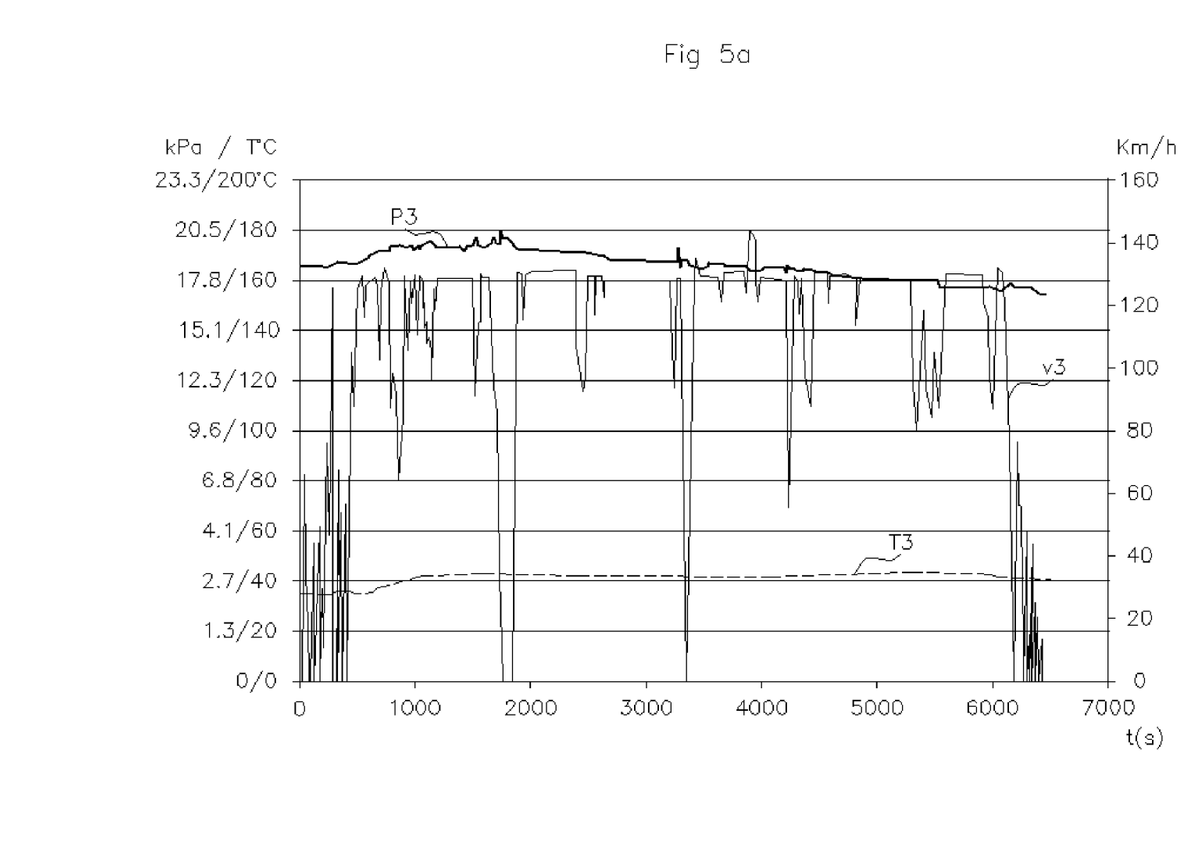
FIG. 5a, a diagram of change over time in the parameters of a tire, in association with its speed, which reveals a situation of slow leakage, and FIG. 5b, in the same slow leakage situation (FIG. 5a above), the detailed diagram of change in the magnitudes expressed for FIG. 3b or 4b, with reiteration of an alarm confirmation.

With reference to FIG. 5a, the diagram illustrates the change in the direct measurements of the parameters P3 and T3 of a tire, still in connection with the speed v3 (in km/h) of the vehicle, over a wide processing range "t" of approximately 7000 seconds (or approximately 2 hours) covering a third journey.

In this diagram, it appears that the pressure P3 reduces slowly (approximately 0.3 Pa/min), the temperature T3 is virtually constant and the speed of the vehicle v3 is maintained at 150 km/h, with several sharp decelerations followed by fast accelerations in order to return to the 150 km/h level. The journey appears to be a run on a freeway.

Figure 5B:
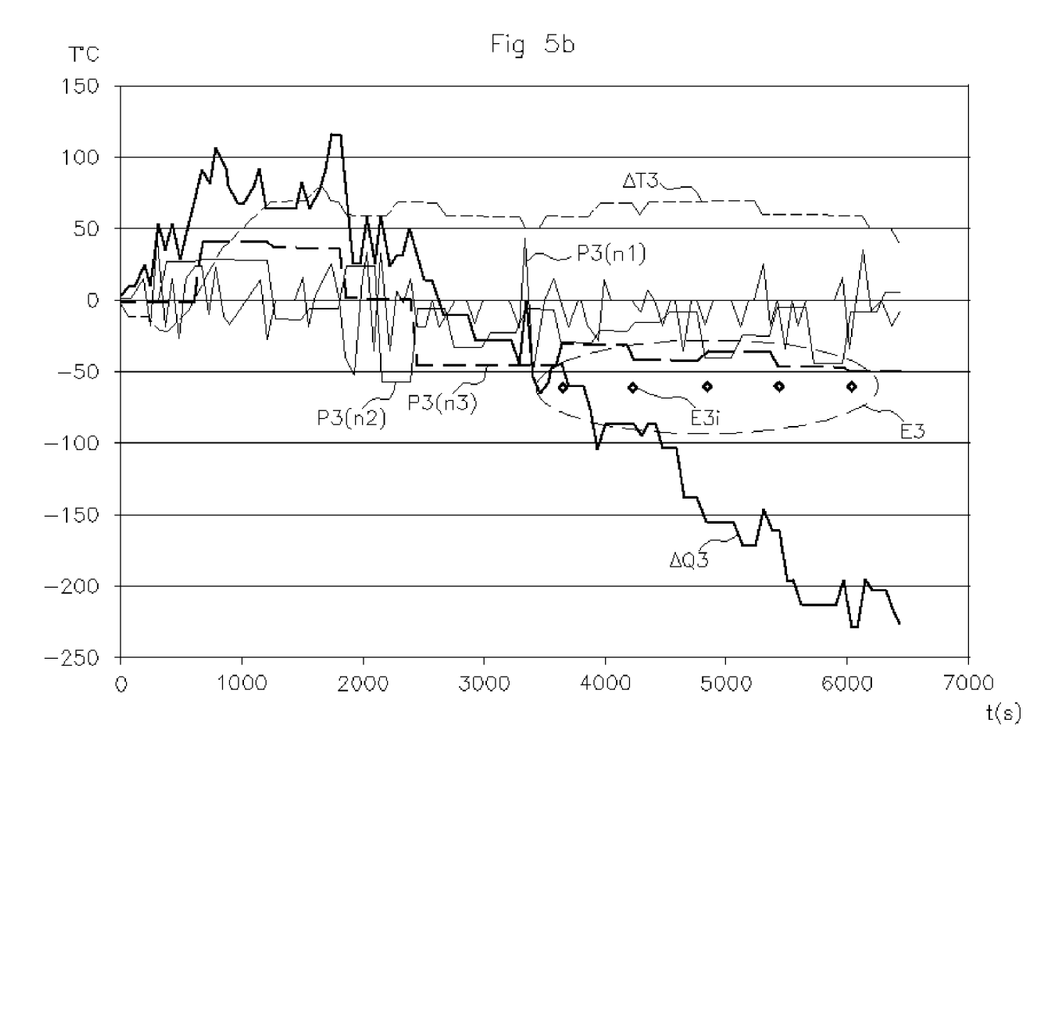

The detailed diagram of FIG. 5b shows, on the larger scale of temperature already used for the diagrams of FIGS. 3b and 4b (the temperature scale T multiplied by 10), the change in the estimation magnitudes ΔT3, ΔQ3 and slopes p3(n) of variation in the significant difference ΔQ3, for the same sampling period settings "n" as before: n1=1 min, n2=5 min and n3=10 min.

More precisely, the referenced temperature ΔT3 varies hardly at all after a startup phase with a duration equal approximately to 2000 seconds and the significant difference ΔQ3 has a steady decrease to the negative values, after this same startup phase, because of the reduction in pressure P3 (FIG. 5a). The slopes p3(n1), p3(n2), p3(n3) of variations in significant differences are greatly affected by interference but retain a substantially constant mean value.

However, the slope p3(n3) adopts negative values after the startup phase, namely from approximately 2400 seconds. The slope p3(n3) then fulfils the threshold criteria S1c and S2c—of amplitude and period for a number of periods that is sufficient to qualify the leakage as slow: in the example, S1c=−10° C. and S2c=1800 seconds. In the period of development of an estimation E3, five slow leakage signals E3i are then triggered by the alarm 120 (FIG. 1) in the example illustrated. This figure therefore illustrates the case of a slow leakage.

The invention is not limited to the exemplary embodiments described and shown. Thus, it is possible to temporarily increase, while running, the duration of the confirmation phase during variations in high temperature in order to prevent false alarms: running on a snow-covered road or in a rain storm, or after washing.

Moreover, the number of detection thresholds is not limited to two pairs of values but it is possible to provide other thresholds characteristic of decorrelations between the variations in the referenced temperature ΔT, the significant difference ΔQ and/or the slopes p(n), reflecting particular conditions arising during the journey: sudden cooling or increase in temperature, change of altitude, etc.

Moreover, it is possible to modify, while running, the period settings by modifying the number of measurement periods for each sampling period.

As a variant, it should be noted that it is possible to express the temperature as a function of the pressure ($\Delta T_P$,) and not the pressure as a function of the temperature ($\Delta P_T$) as explained in the exemplary embodiment chosen above. Specifically, the temperature varies less rapidly, which makes it possible to smooth the curve that is obtained. In this case, for each tire, the parameters are referenced ($\Delta P, \Delta T_P$) on the basis of the values of pressure (P) and of temperature (T) minus reference measurements ($P_{ref}, T_{ref}$) taken on startup, and the conversion of the temperature into pressure ($\Delta T_P$) is determined by the application of a coefficient (K'P) equal to the ratio between a reference pressure measurement ($P_{ref}$) and a reference temperature measurement ($T_{ref}$) to the values taken by the converted temperature ($\Delta T_P$).

Moreover, the invention applies to any inflated tire without being limited to motor vehicles.

The invention claimed is:

1. A method, using at least one sensor and a computing device with a processor unit and memory, for detecting air leakage from a tire, comprising:

measuring, via a sensor in communication with the computing device, and recording in the memory of the computing device, values of two parameters, temperature (T) and pressure (P), of air inside the tire at successive measurement moments in time in which a measurement is taken by the sensor and recorded in the memory, each measurement moment separated by a measurement period;

referencing the measures values (T, P) by calculating differences between the measured values of temperature (T) and measured values of pressure (P) with respective reference values of temperature and pressure ($T_{ref}, P_{ref}$) to produce and record referenced values of temperature and pressure (ΔT, ΔP);

calculating, for each of the recorded referenced pressure measurements (ΔP), a converted pressure ($\Delta P_T$) corresponding to a value of magnitude calibrated in temperature, according to the following formula:

$$\Delta P_T = KT \times \Delta P,$$

where KT is defined by the relation $T_{ref}/P_{ref}$;

monitoring and recording, for at least two sampling periods (n1, n2, n3), where each sampling period comprises a plurality of measurement periods, a change in a difference (ΔQ) calculated as $$\Delta Q = \Delta P_T - \Delta T$$

for the values of the referenced temperatures (ΔT) and converted pressures ($\Delta P_T$) of the measurement periods of respective sampling periods, where values of measured temperatures (T) and pressure (P) associated with any sampling period collectively form a corresponding sampling measurement;

determining, averaging, and storing variations in values of the differences (ΔQ) for two consecutive sampling measurements, with reference to a sampling period (n);

determining slopes (p(n)) of variation of the difference (ΔQ) for each sampling period (n1, n2, n3); and upon a determination of a slope of variation (p(n)) of a difference (ΔQ) that remains negative for at least one sampling period (n1, n2, n3), outputting from the computing device an indication that an air leakage is detected (E1, E2, E3), as well as an indication of a fast or slow level of flow rate based on a comparison against predetermined threshold values (S1a, S2a; S1b, S2b; S1c, S2c).

2. The detection method as claimed in claim 1, wherein the number of sampling period is equal to three (n1, n2, n3), with a first sampling period (n1) equal to a measurement period, and the remaining two sampling periods (n2, n3) equal to multiples of the measurement period.

3. The detection method as claimed in claim 2, wherein the pressure measurements (P1, P2, P3) and temperature measurements (T1, T2, T3) of the air of each tire of a vehicle are supplied to the computing device by sensors (101, 102) at each tire according to the measurement period (n1), transmitted to the processor unit (110) at moments corresponding to the measurement period (n1), and the measurements corresponding to the moments of each sampling measurement being selected on the basis of the measured values stored in the memory (114) once the vehicle starts and is running, and processed in the central unit (110) in order to supply the slopes (p(n)) of variation in the significant difference (ΔQ).

4. The detection method as claimed in claim 2, wherein, for each tire of a vehicle, a converted pressure ($\Delta P_T$) is calculated, and initial values of the referenced temperature (ΔT) and the converted pressure ($\Delta P_T$) are determined on the basis of initial values of temperature (T) and of pressure (P) minus respective reference measurements of temperature and pressure ($T_{ref}, P_{ref}$) read from the memory on startup of the vehicle, and the converted pressure ($\Delta P_T$) is determined with the a coefficient (KT) equal to a ratio between the reference temperature measurement ($T_{ref}$) and the reference pressure measurement ($P_{ref}$).

5. The detection method as claimed in claim 2, wherein the slope (p(n)) of variation in the significant difference (ΔQ) is established, for each sampling period, by an average variation in said significant difference (ΔQ) over a number of consecutive sampling periods defining a processing period.

6. The detection method as claimed in claim 2, wherein the number of sampling periods taken into account is sufficient to confirm the reproducibility of the difference variation slope values with the aid of at least two determined threshold values, an amplitude threshold value (S1a, S1b, S1c) and a period confirmation threshold value (S2a, S2b, S2c).

7. The detection method as claimed in claim 1, wherein the pressure measurements (P1, P2, P3) and temperature measurements (T1, T2, T3) of the air of each tire of a vehicle are supplied to the computing device by sensors (101, 102) at each tire according to the measurement period (n1), transmitted to the processor unit (110) at moments corresponding to the measurement period (n1), and the measurements corresponding to the moments of each sampling measurement being selected on the basis of the measured values stored in the memory (114) once the vehicle starts and is running, and processed in the central unit (110) in order to supply the slopes (p(n)) of variation in the significant difference (ΔQ).

8. The detection method as claimed in claim 7, wherein, for each tire of a vehicle, a converted pressure ($\Delta P_T$) is calculated, and initial values of the referenced temperature (ΔT) and the converted pressure ($\Delta P_T$) are determined on the basis of initial values of temperature (T) and of pressure (P) minus respective reference measurements of temperature and pressure ($T_{ref}, P_{ref}$) read from the memory on startup of the vehicle, and the converted pressure ($\Delta P_T$) is determined with the a coefficient (KT) equal to a ratio between the reference temperature measurement ($T_{ref}$) and the reference pressure measurement ($P_{ref}$).

9. The detection method as claimed in claim 1, wherein, for each tire of a vehicle, a converted pressure ($\Delta P_T$) is calculated, and initial values of the referenced temperature (ΔT) and the converted pressure ($\Delta P_T$) are determined on the basis of initial values of temperature (T) and of pressure (P) minus respective reference measurements of temperature and pressure ($T_{ref}, P_{ref}$) read from the memory on startup of the vehicle, and the converted pressure ($\Delta P_T$) is determined with the a coefficient (KT) equal to a ratio between the reference temperature measurement ($T_{ref}$) and the reference pressure measurement ($P_{ref}$)).

10. The detection method as claimed in claim 1, wherein the slope (p(n)) of variation in the significant difference (ΔQ) is established, for each sampling period, by an average variation in said significant difference (ΔQ) over a number of consecutive sampling periods defining a processing period.

11. The detection method as claimed in claim 1, wherein the number of sampling periods taken into account is sufficient to confirm the reproducibility of the difference variation slope values with the aid of at least two determined threshold values, an amplitude threshold value (S1a, S1b, S1c) and a period confirmation threshold value (S2a, S2b, S2c).

12. The detection method as claimed in claim 11, wherein, during a period at least equal to the confirmation threshold (S2), for each sampling period (n) in standard running conditions, the slope (p(n)): pg,25
- is substantially zero in the event of no air loss (E1),
- is greatly negative in the event of fast leakage (E2) for at least the shortest sampling period (n1), and
- is constant for at least the longest sampling period (n3), after a drop at least equal to the amplitude threshold (S1c).

13. The detection method as claimed in claim 1, wherein the measurement period (n1) is between 15 seconds and one minute.

* * * * *